UNITED STATES PATENT OFFICE.

NATHANIEL B. POWTER, OF NEW YORK, N. Y.

PHOSPHATIC FERTILIZER.

SPECIFICATION forming part of Letters Patent No. 517,661, dated April 3, 1894.

Application filed April 4, 1893. Serial No. 469,045. (No specimens.)

*To all whom it may concern:*

Be it known that I, NATHANIEL B. POWTER, a subject of Her Britannic Majesty, and a resident of the city, county, and State of New York, have invented certain new and useful Improvements in the Utilization of Slaughter-House Refuse and Similar Waste Products, of which the following is a specification.

The composition described herein is a development from and an improvement upon those described in Letters Patent Nos. 407,240 and 407,241, both of which were granted to me July 16, 1889, and differs therefrom and from all others in that I do not add sulphuric acid, hydrochloric acid or nitric acid; nor do I use combinations of the alkalies to effect the purpose desired. Since obtaining said patents, I have found that when substantially pure phosphate of alumina is thoroughly mixed with refuse animal or vegetable matter such as slaughter house or fishing refuse or garbage, the result is an odorless, dry, granular mass of great utility as a fertilizer, as the organic matter is not deprived of its valuable qualities by said combination. The proportion of phosphate of alumina used may be from five per cent. upward, according to the peculiar character of the special mass of refuse, with which it is to be mixed, as some refuse matter will require more phosphate of alumina than others.

By substantially pure phosphate, I mean an alumina phosphate, which analyzes at from about thirty to forty per cent. alumina and oxide of iron, thirty-two to thirty-nine per cent. $P_2O_5$ the balance being water or moisture, with from three to ten per cent. of insoluble silicates or similar impurities. Such alumina phosphates are on sale and are readily procured in the market; but I do not confine myself to a special chemical formula as limiting the use of alumina phosphate as the presence of what may be considered impurities with regard to the use, to which I put said alumina phosphate, might vary the chemical formula without altering the character of the ingredient as a substantially pure phosphate of alumina.

As the phosphate of alumina is applied to the slaughter house or other refuse, the soluble and volatile ingredients of the refuse matter seem to be taken up by the alumina phosphate. It is desirable that just enough alumina phosphate should be applied to take up all said soluble and volatile ingredients; and a little practice will enable any one to detect when this point is reached. I mix these ingredients preferably by collecting the animal or vegetable refuse matter or similar substance in a suitable vat and then sprinkle the phosphate of alumina either as a dry powder or mixed with water, and then thoroughly stirring the mass for a short time and leaving it to dry out, which it will do in a few hours.

I claim—

The above described composition, which consists of phosphate of alumina containing insoluble phosphoric acid and slaughter house refuse or similar substance, in about the proportions set forth.

N. B. POWTER.

Witnesses:
 W. P. PREBLE, Jr.,
 P. P. QUACKENBOSS.